(12) United States Patent
Klokow et al.

(10) Patent No.: US 11,090,656 B2
(45) Date of Patent: Aug. 17, 2021

(54) MILLING BOWL

(71) Applicant: Loesche GmbH, Duesseldorf (DE)

(72) Inventors: Alexander Klokow, Duesseldorf (DE);
Stefan Hamann, Duesseldorf (DE);
Heide Hammesfahr, Duesseldorf (DE);
Karl-Heinrich Zysk, Duesseldorf (DE)

(73) Assignee: Loesche GmbH, Duesseldorf (DE)

( * ) Notice: Subject to any disclaimer, the term of this patent is extended or adjusted under 35 U.S.C. 154(b) by 314 days.

(21) Appl. No.: 15/776,222

(22) PCT Filed: Nov. 19, 2015

(86) PCT No.: PCT/EP2015/077039
§ 371 (c)(1),
(2) Date: May 15, 2018

(87) PCT Pub. No.: WO2017/084708
PCT Pub. Date: May 26, 2017

(65) Prior Publication Data
US 2019/0262838 A1    Aug. 29, 2019

(51) Int. Cl.
*B02C 15/00* (2006.01)
*B24B 37/025* (2012.01)
*F16H 37/04* (2006.01)

(52) U.S. Cl.
CPC .......... *B02C 15/003* (2013.01); *B02C 15/006* (2013.01); *B24B 37/025* (2013.01); *F16H 37/041* (2013.01)

(58) Field of Classification Search
CPC ... B02C 15/003; B02C 15/006; B02C 15/007; B02C 13/282; B02C 15/06; F16H 37/041; B24B 37/025
See application file for complete search history.

(56) References Cited

U.S. PATENT DOCUMENTS 5,605,292 A *  2/1997  Bunton ................. B02C 15/007
                                                    241/121
2010/0326337 A1* 12/2010 Tsutsumi ................ B02C 25/00
                                                    110/186
(Continued)

FOREIGN PATENT DOCUMENTS

DE       1194685 B     6/1965
DE      10305915 A1    8/2004
(Continued)

OTHER PUBLICATIONS

International Search Report and Written Opinion dated Jul. 4, 2016 for PCT/EP2015/077039 filed Nov. 19, 2015.

*Primary Examiner* — Adam J Eiseman
*Assistant Examiner* — Amer Islam
(74) *Attorney, Agent, or Firm* — Dinsmore & Shohl LLP

(57) ABSTRACT

The invention relates to a milling bowl, in particular for vertical mills, and to the production of such a milling bowl. Milling bowls of this type have hitherto typically been produced from a cast material as a single piece. Due to the increasing size of said milling bowls, said milling bowls can generally only be transported to the destinations by means of special transport. Therefore, the invention creates a milling bowl consisting of assemblies, wherein a double-walled center part formed from two housing shells is provided between a head flange and a base flange. Said center part forms a cavity, which is filled with a curable casting compound such that a rotationally rigid milling bowl is present after the casting compound has been cured.

18 Claims, 3 Drawing Sheets

(56) References Cited

U.S. PATENT DOCUMENTS

| | | | | |
|---|---|---|---|---|
| 2011/0147508 A1* | 6/2011 | Rittler | ............ | B02C 15/006 |
| | | | | 241/278.2 |
| 2012/0168546 A1* | 7/2012 | Mays | ............ | B02C 15/004 |
| | | | | 241/285.2 |
| 2013/0126649 A1* | 5/2013 | Tallent | ............ | B02C 15/02 |
| | | | | 241/131 |
| 2014/0021279 A1* | 1/2014 | Rittler | ............ | H02K 21/16 |
| | | | | 241/117 |
| 2016/0312466 A1* | 10/2016 | Norford | ............ | E04C 1/397 |

FOREIGN PATENT DOCUMENTS

| | | | | | |
|---|---|---|---|---|---|
| EP | 2242583 | A1 | | 10/2010 | |
| GB | 268263 | A | * | 3/1927 | ......... B02C 15/04 |
| GB | 956967 | A | * | 4/1964 | ......... B02C 15/12 |

* cited by examiner

MILLING BOWL

The invention relates to a milling bowl having a lower ring-shaped base flange and an upper ring-shaped head flange for forming or receiving a grinding bed of a vertical mill.

The milling bowl is ring-shaped and constructed to be hollow in the area surrounding its axis of rotation and comprises a center piece, which connects rigidly the head flange and the base flange.

Milling bowls of this kind are employed as an essential component in vertical mills used for the crushing of material such as raw cement material, clinker, slags, various minerals, or even coal.

Reference regarding milling bowls of this kind is made for example in EP 2 242 583 B1 or DE 103 05 915 A1.

Figure 4:
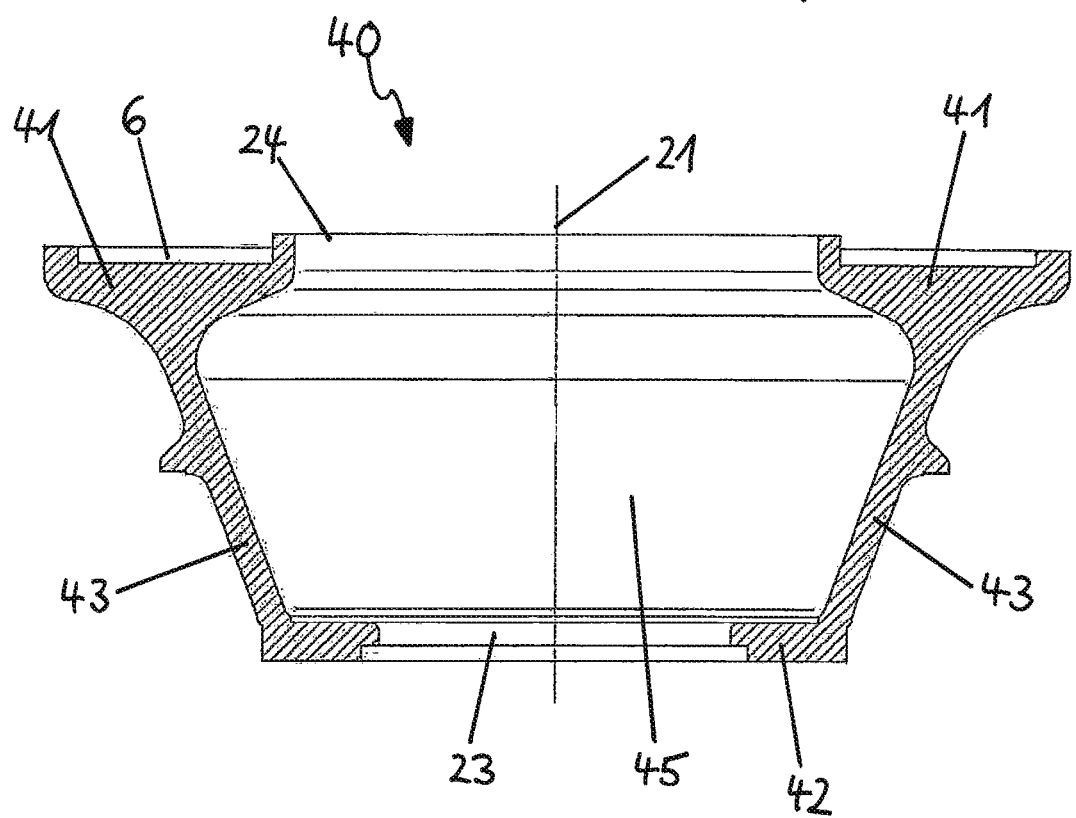

A similar milling bowl according to the prior art is shown in FIG. 4. Typically, milling bowls 40 of this kind have hitherto been manufactured as a single piece and from a cast material.

The lower area of the milling bowl 40 features a base flange 42 and the upper area features a head flange 41. On the whole, the structure of this milling bowl 40 has an approximate shape of a truncated conelike and tapering towards the bottom structure, whereby a conical side wall 43 tapers towards the bottom and connects the head flange 41 with the below base flange 42 to a ring-shaped milling bowl.

Typically, the milling bowl 40 is constructed to be symmetrical with respect to its axis of rotation 21 and has a bottom opening 23 as well as an upper bowl opening 24, thus forming an inner cavity 45 between these openings.

Typically, a channel 6 is provided in the head flange 41 receives segments of grinding plates, which during operation, form the corresponding grinding bed for the crushing and grinding of material.

In its completely assembled condition, a milling bowl 40 of this kind rests upon corresponding bearings in the area of the base flange 42, in which case the rotary drive for the milling bowl 40 is provided in the area of the bottom opening 23.

As a result of the continuous demand for vertical mills of increasing size having enhanced throughput capacity of the vertical mills, the associated increases in milling bowl size, problems have arisen in the field of cement fabrication and at the normally remote locations used for cement production related to the fabrication and transport of these one-piece milling bowls of increasing size made of cast material.

For example, there are vertical mills in use which have a diameter of nearly 8 m at the upper area of the milling bowl and have a diameter of 5 m at the throat of the milling bowl on the bottom side.

Firstly, as a result of the problematic nature of producing these milling bowls as one piece, reliance must be made upon the few manufacturing companies which make milling bowls of this kind.

Secondly, given that the roads and infrastructure appropriate for transporting heavy goods of this kind are often not available, a significant issue exists with using heavy goods vehicles to transport milling bowls of this kind weighing, for example, a total of approximately 90 tons and having a diameter of 8 m or more, to somewhat remote production sites.

Therefore, the object of the invention is to be able to overcome the aforementioned disadvantages and to achieve greater flexibility in the production of milling bowls of this kind even given growing diameters and hence also greater weights while achieving a simplified transport process along with reduced dependence on specialist manufacturers as well as an improved cost structure.

This object is to be achieved according to the invention by means of a milling bowl of the aforementioned kind using the features of claim 1 and by means of a method for producing a milling bowl of this kind using the features of claim 16.

An important core concept of the invention is to move away from a production of one-piece milling bowls made of cast material and in favor of devising a milling bowl having a plurality of smaller components, whereby hollow structures are selectively provided within the structure of the milling bowl, and these hollow structures are able to be produced with a curable, in particular, a non-shrinking, casting compound to manufacture a rigid milling bowl unit near the intended site of operations.

According to the invention, this important core concept is to be realized by means of a milling bowl for vertical mills utilizing the idea of a lower, ring-shaped, and separate base flange and an upper, ring-shaped, and separate head flange in order to form or receive a grinding bed of the vertical mill. In this case, the area surrounding the axis of rotation of the ring-shaped milling bowl is constructed to be hollow. The head flange and the base flange are rigidly connected together by means of a center piece.

This center piece provided between the head flange and the base flange is of double-walled design and has two casing shells, which are spaced apart.

The cavity formed in this manner between the casing shells of the center piece and the two flanges is filled with a curable, in particular a non-shrinking, casting compound so that, following the curing process of the casting compound, the two flanges along with the center piece form a rotationally rigid milling bowl.

With respect to the method, the production of a ring-shaped milling bowl according to the invention having, in the vertical section, a hollow structure with the approximate shape of a truncated cone, takes place by means of the head flange and the base flange of the milling bowl being separately produced as a plurality of pieces or as one piece. Taking the transportation issues mentioned hereinafter into account, the head flange, which has a greater diameter, in this case is preferably designed and produced to be a plurality of pieces, whereas the base flange, which is typically smaller in diameter with respect to dimensions and to weight, is as one separate piece.

According to the method, a center piece, which features two casing shells, is produced separately from the head flange and the base flange.

This center piece is provided for a connection between the base flange and the head flange, and it quasi supports the upper head flange during assembly. Prior to connecting the center piece to the head flange and affixing the head flange to the center piece, reinforcement anchors are attached to opposing surfaces of the casing shells.

Thereafter, components including the head flange, casing shells of the center piece and the base flange are rigidly connected with one another, specifically forming thereby a ring-shaped cavity between the casing shells.

A curable casting compound is then introduced into the cavity formed between the casing shells via openings in the head flange, and this casting compound, the material properties of which are not shrinking, slight swelling, then cures. The slight swelling capacity and hence the volume of the casting compound allows the casting compound to be fed at a high density into components including the head flange, the casing shells, and the base flange so that, after the casting compound has cured, a stiff and rotationally rigid milling bowl is present as unit.

In this context, "fed at a high density" is understood to mean that the casting compound is introduced very tightly and in the absence of air pockets and cured, thus achieving a strong connection with the casing shell and the flange surfaces surrounding the cavity in order for the relevant milling and rotational forces to be transmitted to the base flange not only via the casing shells but essentially also via the cured casting material.

Important advantages of the milling bowl according to the invention and the corresponding production method are, in particular, more economical production costs for the smaller, lighter, and separately produced individual cast pieces since such pieces are able to be produced in a large number of foundries instead of having to rely on companies being specialized for large pieces such as fully cast milling bowls. Moreover, transportation costs are able to be reduced significantly since special transport operations are no longer required such as those used for the previously one-piece milling bowls.

In addition, the production of the requisite casing shells can be contracted to take place near the site of production and establishment of the corresponding vertical mill. Similarly, the final assembly and the filling of the milling bowl with the appropriate casting compound can take place in the close-up range or directly at the site of establishment of the corresponding vertical mill.

Advantageously, the casing shells of the center piece of the milling bowl feature reinforcement anchors which are embedded into the cured casting compound.

Prior to introducing the casting compound, the reinforcement anchors can be attached for this purpose to casing shell interior surfaces which are oriented toward the cavity, for example by means of welding, as well as being provided in the form of expansion anchors.

In order to further enhance the stiffness of the center piece, the ends of the reinforcement anchors can be welded or attached by other means to both casing shell interior surfaces.

The orientation and arrangement of these reinforcement anchors takes place not only in a direction radial to the milling bowl, but rather also at varying heights along the casing shells, whereby selectively intersecting or spoke-like arrangements can be provided to other reinforcement anchors.

Consequently, the reinforcement anchors are arranged at varying orientations within the cavity formed by the casing shells, with their ends preferably being affixed to both casing shells.

With a view to further enhancing the transmission of the relevant forces and torques, the reinforcement anchors are oriented contrary to the direction of rotation of the milling bowl while in operation.

By means of introducing the reinforcement anchors in this manner, the strength of the ring-shaped core cast into the cavity is enhanced, and a bond is created between the casing shells and the ring-shaped core.

Examples of usable reinforcement anchors are, for example, anchor bolts as per DIN 529 as well as free-form reinforcement anchors made of reinforcing steel such as those used in concrete materials. Depending on their position, size, and number, the reinforcement anchors can be provided in a variety of shapes; in particular, U-shaped, S-shaped, or L-shaped. The connection between the reinforcement anchors and the casing shells can be a threaded as well as a welded connection.

To its advantage, the head flange features a larger outer diameter than the base flange since this thereby determines both the width of the grinding bed and, therefore, the ultimate throughput capacity of a vertical mill in operation.

Moreover, it has been shown that a base flange of smaller diameter is sufficient for accepting the forces acting via said flange on the bearing as well as additionally being able to transmit the forces acting on the milling bowl via the rotary drive.

As a result, in its preferential form, the milling bowl features two casing shells which, in its vertical section, are arranged to form a nearly wedge-shaped structure which tapers together in the direction of the base flange, so that by this arrangement, the milling bowl nearly forms a hollow body with an outer ring structure in the shape of a truncated cone.

As an alternative to the aforementioned preferential structure, the two casing shells can also be situated at an approximate constant radial distance from one another, in which case a ring-shaped wall running in a vertical direction will also be formed by the center piece of a milling bowl. A head flange of greater radial size can be provided in this case as well.

A significant advantage with respect to costs and transportation can be achieved by way of constructing at least the head flange as multiple pieces.

Consequently, the head flange can consist of a plurality of segments, which are first assembled together along with the other components into a complete milling bowl at the place of and in the manner of their intended use.

Taking the size of the outer diameter of the head flange into consideration, this flange can advantageously be produced as two, three, four, or another number of segments.

The base flange, which has a smaller outer diameter, can preferentially be produced as one piece as long as special transport procedures do not become necessary, particularly as this case has the effect of simplifying the design for both transmitting the forces acting on the milling bowl to the bearing of the base flange and applying the drive torques for the milling bowl.

With a view to a simplified manufacturing, the two casing shells can preferentially be constructed also to be a plurality of pieces. Doing so simplifies the transportation of these components and segments, while also making it possible to produce said pieces in the vicinity of the site of production.

Regarding the curable casting compound, it is chosen a mass to be as incompressible as possible with non-shrinking properties, whereby this mass can, in particular, be a concrete, a resin, or a plastic, with the latter being based, in particular, on a high-performance polymer or polyamide.

The curable casting compound can preferably be mixed and reinforced with fibers such as glass fibers, carbon fibers, or metal fibers. This can specifically improve the mechanical properties of the cured casting compound and, in particular, can be prevent the development of cracks in the cured casting compound to the greatest possible extent. The casting compound itself can be introduced in a liquid, semi-liquid, or a paste-like form, then compressed and deaerated. The introduction of the casting compound can take place in one or a plurality of work steps, as a result of which various layers are produced in the cavity between the casing shells, the properties of these layers being able to differ from one another.

A suitable casting compound may have approximately the following properties. A minimum compressive strength in the range of 30 N/mm². A minimum tensile strength of approximately 5 N/mm². A thermal expansion coefficient of approximately 5-15×10−6/° K. A maximum swelling degree of approximately 1%. Insofar as a minimum degree of shrinkage for the casting compound is to be taken into consideration, this should be <0.5%. A thermal resistance of up to at least 200° C. should also be provided.

The head flange and the base flange are preferably produced as cast pieces or made from iron, in which case the latter may also be metal slabs.

The yield strength or rather the 0.2% proof stress for the flange should be >200 N/mm², and an elongation-to-break of >3% should be achieved.

It is advantageous for the casing shells, which are rigidly connected to the two flanges, to be produced from steel. Metal sheets which are suitable for welding can also be used.

A 0.2% proof stress of >200 N/mm² and an elongation-to-break of >15% should be provided for the casing shell materials.

The head flange features casting openings and aeration openings in order to enable the introduction of the casting compound into the ring-shaped cavity between the casing shells. A large number of casting openings are provided for this purpose distributed across the circumferential length in the ring-shaped head flange. Slightly smaller aeration openings are in the head flange offset at a distance radially outward of these casting openings and with distance to these. On the one hand, this approach allows the casting material to be introduced essentially free of inclusions and on the other hand the cavity between the casing shells to be well-aerated.

However, if doing so is deemed necessary, the casting compound can also be compressed and aerated even further by means of suitable vibrators. Consequently, the casting openings are also designed for the use of vibrators.

In the process of developing of the milling bowl, it has been shown that the casting compound is able to comprise approximately 40% to 60% of the overall mass of the milling bowl. The associated advantage thereby is a significant reduction in the weight of the steel and cast pieces being produced.

Due to the individual pieces being lighter allows the handling and transport of these pieces to be simplified, so that costly heavy transports and special transports are no longer necessary. Based on a one-piece milling bowl, the total weight being transported can in this way be reduced by up to approximately 40%. As a result, the assembly of the individual pieces is able to first take place at the intended site of operations, in which case the casting compound being cured is also first introduced into the ring-shaped cavity between the casing shells at this location.

Consequently, this concept according to the invention using a milling bowl assembled in said manner leads to significant cost savings in comparison with a one-piece milling bowl produced from cast material.

An additional advantage evident thereby is that, on the basis of this invention, milling bowls of even much greater size will be able to be realized in a relatively economical manner.

According to the invention, the method for producing a ring-shaped milling bowl comprising, a vertical section, a hollow structure with the approximate shape of a truncated cone is characterized in that a head flange and a base flange of the milling bowl are first separately produced as a plurality of pieces or, in the case of the base flange, as one piece. A center piece, which features two casing shells and connects the head flange and the base flange, is likewise produced separately.

Reinforcement anchors are attached at varying orientations to opposing surfaces of the casing shells in the cavity formed between.

Components including the head flange, casing shells of the center piece and the base flange are then rigidly connected with one another, and subsequently the relatively cold curable casting compound is filled via the openings in the head flange into the cavity formed between the casing shells. The casting compound, the volume of which has non-shrink properties, is cured or self-cures so that, following the curing process, a milling bowl is present as a stiff and rotationally rigid unit.

In this manner, a finished milling bowl emerges as an inseparable unit comprising said individual pieces and components. In addition, the form fit and the press fit connection, in particular, between the casing shells but also between the head flange and the base flange, can be improved by means of introducing reinforcement anchors, which are embedded into the cured casting compound.

A honeycomb structure can also be used instead of or in combination with the reinforcement anchors.

Thus, the milling bowl concept according to the invention allows the total weight of the milling bowl to be equal to or even greater than that of a one-piece milling bowl, so that the desired "anvil effect," of the milling bowl which was previously achieved by one-piece milling bowls made by casting, can also be achieved by the hybrid milling bowl according to the invention despite the use of a cast material.

Consequently, the "anvil effect," which should be understood to mean the absorption and cushioning of forces acting vertically on the grinding bed and the milling bowl, can also be achieved using the hybrid milling bowl according to the invention.

Figure 1:
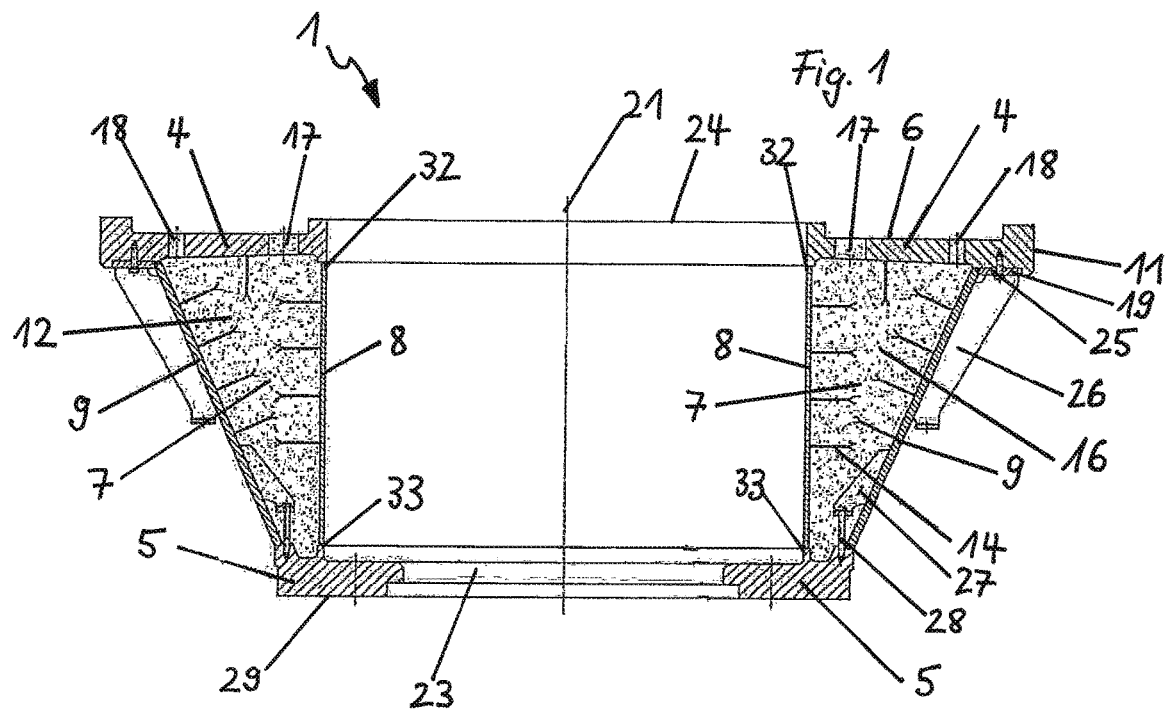
Figure 2:
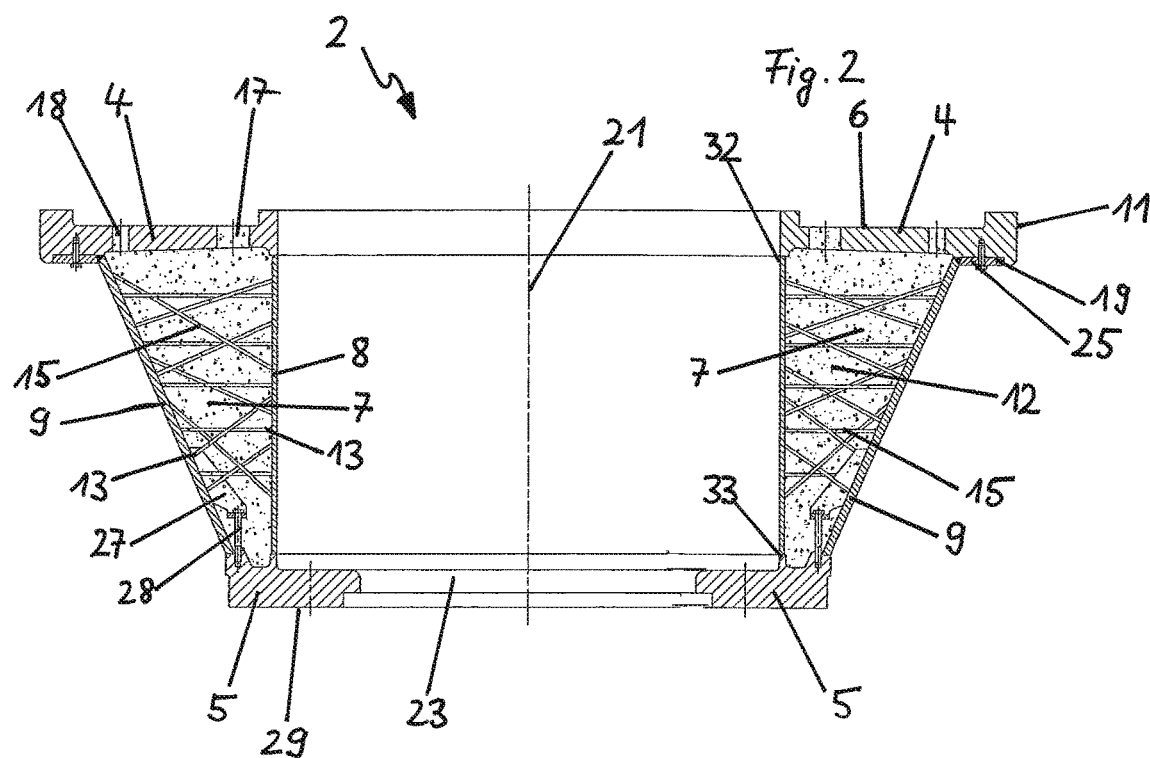
Figure 3:
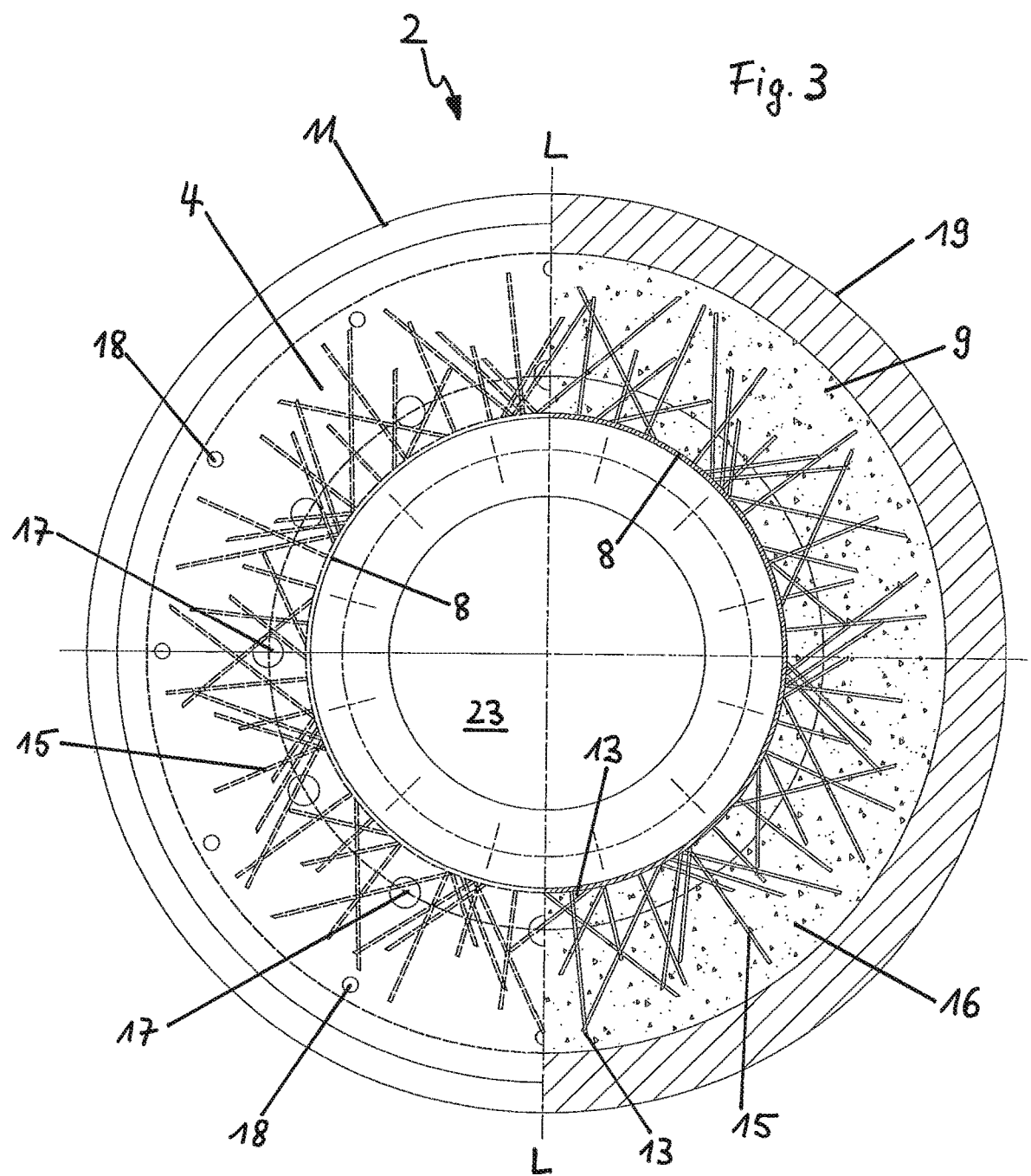

The milling bowl according to the invention will be explained in greater detail with the aid of schematic drawings for two examples. Shown are:

FIG. 1 a vertical section through a milling bowl according to the invention as specified in a first example regarding the reinforcement anchors in particular;

FIG. 2 a comparable vertical section through a second example of a milling bowl according to the invention, having, in particular, reinforcement anchors different from than in FIG. 1;

FIG. 3 an overhead view of the milling bowl according to FIG. 2, wherein the half to the left of the L-L line shows the milling bowl with a head flange attached and the corresponding openings are also shown, and the dashed lines represent rod-like stiffening anchors and their orientation. The right half of the L-L line in FIG. 3 shows an overhead view of the milling bowl according to FIG. 2 with the head flange removed; the solid lines are rod-like reinforcement anchors embedded into a casting compound; and FIG. 4 a vertical section through a milling bowl produced as one-piece from cast material according to a prior art along with the significant elements thereof.

In order to achieve greater flexibility for the company producing this milling bowl with respect to dimensions, delivery time, transportation costs, and, ultimately, aggregate production costs, which include assembly at the intended site of operations.

The milling bowl 1 shown in vertical section in FIG. 1 is produced to be ring-shaped and is made of a plurality of components.

The lower component of the milling bowl 1 features a ring-shaped base flange 5, which, in consideration of its outer diameter, is preferably produced as one piece from a cast material or steel material. A ring-shaped head flange 4, which has a greater outer diameter 11 than the base flange 5, is provided on the upper side of the milling bowl 1.

The head flange 4, which is manufactured from a cast material, preferably has a plurality of ring segments and may consist of, for example, three or four ring segments.

Provided in the head flange 4 is a circular bowl opening 24, which is in the center of and symmetrical with respect to an axis of rotation 21. Circular casting openings 17 and aeration openings 18 are furthermore present in the head flange.

The head flange 4 and the ring segments thereof are preferably produced from cast material or, for example, from metal slabs.

The milling bowl 1 furthermore features a ring-shaped center piece 7, which is formed by an inner casing shell 8 and an outer casing shell 9.

While the inner casing shell 8 nearly extends vertically upward from a lower fastening area 33, where it fastens together with the base flange 5, the outer casing shell 9 is fastened in the outer area of the ring-shaped base flange 5 like a cone with an opening angle upwards base flange 5.

Advantageously, both casing shells 8, 9 can be produced as a plurality of pieces, in particular, each as two segments, which are preferably welded together to create an inner casing ring and, in the outer area, a cone-shaped outer casing ring. Both casing shells 8, 9 are preferably produced from a ferrous material.

When the milling bowl 1 is assembled, these casing shells 8, 9 form between them a nearly wedge-shaped cavity 12, which tapers towards the bottom. At the top, the upper end of the outer casing shell 9 is furnished with a flat iron ring 19 as a horizontal projecting flange, which is on the one hand, for example, welded onto the upper end of the outer casing shell 9, and is on the other hand, for example, rigidly connected to the lower face of the outer area of the head flange 4 by means of a screwed attachment 25.

Following the construction of the casing shells 8, 9, or rather the segments thereof, reinforcement anchors 14, which in the example are rod-shaped and furnished with a V-shaped end, are, in particular, rigidly welded onto the inner walls of the casing shells 8, 9. A screwed attachment is also possible. In the example shown, these reinforcement anchors protrude from their attachment zones into the cavity 12 in a nearly perpendicular direction. In the example shown according to FIG. 1, these reinforcement anchors 14 are shorter in length, and they do not extend as far as the opposite interior surface of the corresponding casing shell. It is also possible for these reinforcement anchors to be attached to the lower side of the head flange 4.

At their upper end sectors, the casing shells 8, 9 are on the one hand firmly attached to the head flange 4 by means of attachments 32 and 25. The same is true of the lower sectors, where fastenings 33 are provided for the inner casing shell 8, and where fastenings by means of, for example, a fastening anchor 27 and a threaded bolt 28, are also provided for rigidly attaching the outer casing shell 9 to the base flange 5. These means for fixing the casing shells 8, 9 to the flanges 4 and 5 can also be provided as form fits and press fits.

In the example, a reinforcing iron 26 is welded, for example on the outer surface of the outer casing shell 9 in order to further reinforce the iron ring and, in particular, of the upper, horizontally projecting flat iron ring 19, which extends from the upper end of the casing shell 9 and into the middle thereof. Said reinforcing iron is, for example, welded, thus achieving greater overall stiffness between the center piece 7 and the head flange 4.

Subsequent to the previously described construction and assembly of the individual components of the milling bowl 1 according to FIG. 1, an additional important step takes place for the final completion of the desired milling bowl 1.

At this point, a casting compound 16 is introduced via the casting openings 17 so as to fill the cavity 12 formed between the casing shells 8 and 9 completely and tightly, in particular without air pockets.

Chosen for this purpose is a mass, which does not shrink upon curing and which, advantageously, exhibits a slight swelling properties during the curing phase.

Aeration openings 18 in the head flange are slightly offset at a distance from and basically radially outward from the casting openings 17. These aeration openings 18 enable the gases present in the cavity 12 during the phase when the casting compound 16 is being introduced to easily escape, thus also achieving a tight seal at the interfaces between the casting compound and the metallic or cast surfaces.

A preferential casting compound is one which, for example, a concrete mixture which interacts with the reinforcement anchors attached in the cavity 12 to produce a ring-shaped core made in the mentioned example, of reinforced concrete having high compressive and tensile strength along with a relatively low coefficient of thermal expansion.

It is also possible to use other casting compounds based on resins or plastics and based in this case in particular on a high-performance polymer or polyamide.

The milling bowl 1 according to FIG. 1 has a stepped, ring-shaped base opening 23 in the base flange 5.

Thus, the lower surface 29 of the base flange 5 rests upon a bearing arrangement, which enables the rotation of the completed milling bowl 1, which is one component of a vertical mill. Otherwise, the gearbox flange used for the milling bowl's rotary drive is provided in the area of the base opening 23.

The concept according to the invention for producing the schematically illustrated milling bowl not only goes beyond achieving a significant cost reduction in comparison with a cast milling bowl produced as one piece.

Indeed, it has been shown that the overall weight of a milling bowl produced in this manner, which measures, for example, approximately 100 tons, can be designed to be even greater in comparison with a one-piece cast milling bowl of approximately the same dimensions, which can weigh approximately 901 tons.

This can also be achieved by virtue of the fact that the volume of the cavity 12 between the casing shells 8, 9 is approximately four times as large as the volume of the center piece 43 of a cast milling bowl.

For example, assuming a casting compound made of reinforced concrete, the weight of the casting compound in relation to the overall weight of the milling bowl can be as much as approximately 60%, whereas the cast and metal pieces in the other components make up only approximately 40% of the overall weight of the milling bowl.

In addition, it should be noted with respect to the following FIGS. 2 and 3, that in this application, the same reference signs refer to the same components and objects.

The milling bowl 2, shown in FIG. 2 as a further example has, in its vertical section, essentially the same structure as was previously described in regards to FIG. 1.

As compared to the milling bowl 1 according to FIG. 1, the key difference exists in the arrangement of the reinforcement anchors 15 within the cavity 12 formed between the inner casing shell 8 and the outer, conical casing shell 9.

In the example according to FIG. 2, the reinforcement anchors 15 in the cavity between the inner casing shell 8 and the conically tapering outer casing shell 9, into which the casting is poured, are arranged so that the ends 13 of the reinforcement anchors are in each case welded onto both interior surfaces of the casing shells 8, 9.

In this context, in addition to the reinforcement anchors being radially arranged and oriented, the reinforcement anchors 15 can also be welded at varying heights onto the corresponding casing shell 8, 9.

In consideration of FIG. 3 makes it evident that the reinforcement anchors 15, for example extending from the surface of the inner casing shell 8, are pointing randomly outward at virtually every angle of orientation. In other words, the reinforcement anchors 15 provided will, in their immediate area, overlap, intersect, and traverse not only in a horizontal plane, but rather (using the vertical direction as a basis) also in three dimensions.

The reinforcement anchors can also be knotted together.

The arrangement of the reinforcement anchors 15 can also have an angular component contrary to the direction of rotation of the milling bowl 2, as a result of which the transmission of forces and torques acting on the casting compound, and hence on the components rigidly connected thereto, will be improved.

The area at left of the L-L line in the schematic depiction according to FIG. 3 shows, as it were, an overhead view of the milling bowl 2 according to FIG. 2 with the head flange 4 placed on top.

The channel 6 formed in the upper surface of the head flange 4 features casting openings 17, which are situated radially inward in the example, as well as circular aeration openings 18, which are situated radially outward in the example.

Facilitated by the conical orientation of the outer casing shell 9, the gas present in the cavity 12 during the casting compound is being poured into the interior cavity 12 through the casting openings 17 can easily escape via the aeration openings 18.

In order to enhance the compression of the poured casting compound, it can, for example, be compressed by means of vibrators at the casting openings 17.

Advantageously, the openings 17, 18 are sealed by means of the casting compound or another material.

To create the grinding bed itself, the appropriate segments, which are typically made of hardened ferrous materials, are inserted into the channel 6 and secured.

The right half of the L-L line in the overhead view depicted in FIG. 3 shows, as it were, the right section of the milling bowl 2 according to FIG. 2 with the head flange 4 removed. The outer semicircle 19 represents in this context the flat iron ring, which according to FIG. 2, supports the head flange 4 from below by means of a screwed attachment 25.

The drawings shown are schematic illustrations, so that simplifications are present in the depictions.

For example, the outer edge of the flat iron ring 19 has a slightly smaller diameter than the outer edge 11 of the head flange 4.

The section on the right seen in FIG. 3 shows the reinforcement anchors 15 represented as solid lines. These are rods embedded into the casting compound 16 and it is evident in this case that the reinforcement anchors 15 cross over and overlap one another.

Therefore, the multi-piece concept according to the invention for producing a milling bowl creates a high degree of flexibility with respect to the material and the dimensional design of a milling bowl, while also being able to significantly reduce the cost of the qualitative requirements for a milling bowl.

The invention claimed is:

1. A milling bowl for use in vertical mills, having a lower ring-shaped base flange and
   an upper ring-shaped head flange for forming or receiving a grinding bed of the vertical mill,
   wherein the milling bowl is ring-shaped and constructed to be hollow in an area surrounding its axis of rotation, and
   a center piece, which connects rigidly the head flange and the base flange,
   wherein a cavity, which is formed between casing shells of the center piece and the two flanges, includes a cured casting compound that fills in the cavity, and
   wherein the two flanges along with the center piece and the cured casting compound form a rotationally rigid milling bowl,
   wherein
   a) the center piece provided between the head flange and the base flange is a separate piece from the head flange and the base flange, and
   b) the center piece is of double-walled design with the two casing shells, and
   c) the casing shells of the center piece feature reinforcement anchors, which are embedded into the cured casting compound.

2. The milling bowl according to claim 1,
   wherein
   the head flange has a greater outer diameter than the base flange.

3. The milling bowl according to claim 1,
   wherein
   the two casing shells are arranged to make a nearly wedge-shaped structure in a vertical section which tapers together in the direction of the base flange.

4. The milling bowl according to claim 1,
   wherein
   the two casing shells are situated at an approximate constant radial distance from one another.

5. The milling bowl according to claim 1,
   wherein
   at least the head flange is constructed to be a plurality of pieces.

6. The milling bowl according to claim 1,
   wherein
   the two casing shells are constructed to be a plurality of pieces.

7. The milling bowl according to claim 1,
   wherein
   the base flange is constructed to be one piece.

8. The milling bowl according to claim 1,
   wherein
   the milling bowl has, in its vertical section, essentially the structure of a hollow truncated cone.

9. The milling bowl according to claim 1,
   wherein
   the curable casting compound is at least a non-shrinking mass.

10. The milling bowl according to claim 1, wherein the casting compound is reinforced with fibers.

11. The milling bowl according to claim 1, wherein
the reinforcement anchors are arranged at varying orientations within the cavity formed between the casing shells, and
the reinforcement anchor ends are affixed to at least one, or to both, of the casing shells.

12. The milling bowl according to claim 1, wherein
the flanges are produced as cast pieces or are made from iron.

13. The milling bowl according to claim 1, wherein
the casing shells are produced from steel and are rigidly connected to both flanges.

14. The milling bowl according to claim 1, wherein
the head flange features casting openings and aeration openings.

15. A method for producing a ring-shaped milling bowl having, in a vertical section, a hollow structure with an approximate shape of a truncated cone according to claim 1, wherein
a) the head flange of the milling bowl is separately produced as a plurality of pieces, and the base flange of the milling bowl is produced separately as a plurality of pieces or as one piece,
b) a center piece of the milling bowl features two separately produced casing shells between the head flange and the base flange,
c) reinforcement anchors are attached to opposing surfaces of the casing shells,
d) components including the head flange, the casing shells of the center piece, and the base flange are rigidly connected with one another,
e) a curable casting compound is introduced into the cavity formed between the casing shells via openings in the head flange,
f) the casting compound is cured at a non-shrinking volume, and
g) following the curing process, a milling bowl is formed as a stiff, rotationally rigid unit.

16. The milling bowl according to claim 9, wherein the non-shrinking mass is a concrete, a resin, or a plastic.

17. The milling bowl according to claim 16, wherein the plastic is based on a high performance or polyamide.

18. The milling bowl according to claim 10, wherein the fibers are glass fibers, carbon fibers, or metal fibers.

* * * * *